United States Patent
Mori et al.

(10) Patent No.: US 6,399,915 B1
(45) Date of Patent: Jun. 4, 2002

(54) METHOD AND APPARATUS FOR DETERMINING QUALITY OF WELDING AT WELD BETWEEN WORKING MATERIAL PIECES

(75) Inventors: Kiyokazu Mori; Yasuo Kojima, both of Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/526,752

(22) Filed: Mar. 16, 2000

(30) Foreign Application Priority Data

Mar. 23, 1999 (JP) .......................................... 11-077505

(51) Int. Cl.⁷ ............................................. B23K 26/00
(52) U.S. Cl. ................................................. 219/121.83
(58) Field of Search ...................... 219/121.61, 121.62, 219/121.63, 121.64, 121.83, 121.85

(56) References Cited

U.S. PATENT DOCUMENTS

| | | | |
|---|---|---|---|
| 5,085,509 A | * 2/1992 | Gaffard et al. | 219/121.79 |
| 5,674,415 A | * 10/1997 | Leong et al. | 219/121.64 |
| 5,847,356 A | * 12/1998 | Santhanam | 219/121.64 |
| 5,925,268 A | 7/1999 | Britnell | |
| 5,961,858 A | 10/1999 | Britnell | |
| 6,005,717 A | 12/1999 | Neuberger et al. | |
| 6,018,689 A | 1/2000 | Kumura et al. | |

FOREIGN PATENT DOCUMENTS

| | | | |
|---|---|---|---|
| JP | 10-6051 | 1/1998 | |
| JP | 11226766 | * 8/1999 | 219/121.64 |

OTHER PUBLICATIONS

"4KW at the Workpiece: The Ultimate Highpower YAG Laser HL 4006 D", by Haas–Laser GmbH.

"Consistent From Pulse to Pulse: The Pulsed YAG Laser", by Haas–Laser GmbH.

"Quality Control Assurance—New Developments from the LZH", published for the Laser 95' Fair in Munich, Issue 11. Jun. 19–23, 1995.

* cited by examiner

Primary Examiner—Samuel M. Heinrich
(74) Attorney, Agent, or Firm—McDermott, Will & Emery

(57) ABSTRACT

In a method for determining a quality of welding at a weld between working material pieces, an emission intensity of a visible light emitted from the weld during a laser welding using a laser device emitting a laser having a wavelength falling in a range of the wavelengths of near infra-red rays is detected, a first detection signal indicating the light emission intensity of the visible light is outputted, an intensity of a reflected light of the laser from the weld during the laser welding is detected, a second detection signal indicating the light intensity of the reflected light is outputted, frequencies of the first and second detection signals are analyzed and a determination is made whether a result of the laser welding falls in a favorable range of welding and an identification of a cause of welding failure of the weld if the determination that the result of the laser welding falls out of the favorable range is made on the basis of signal intensities of a first frequency component of each of the first and second detection signals lower than an arbitrary frequency in a range from 50 Hz to 200 Hz and of a second frequency component of each of the first and second detection signals higher than the arbitrary frequency.

12 Claims, 14 Drawing Sheets

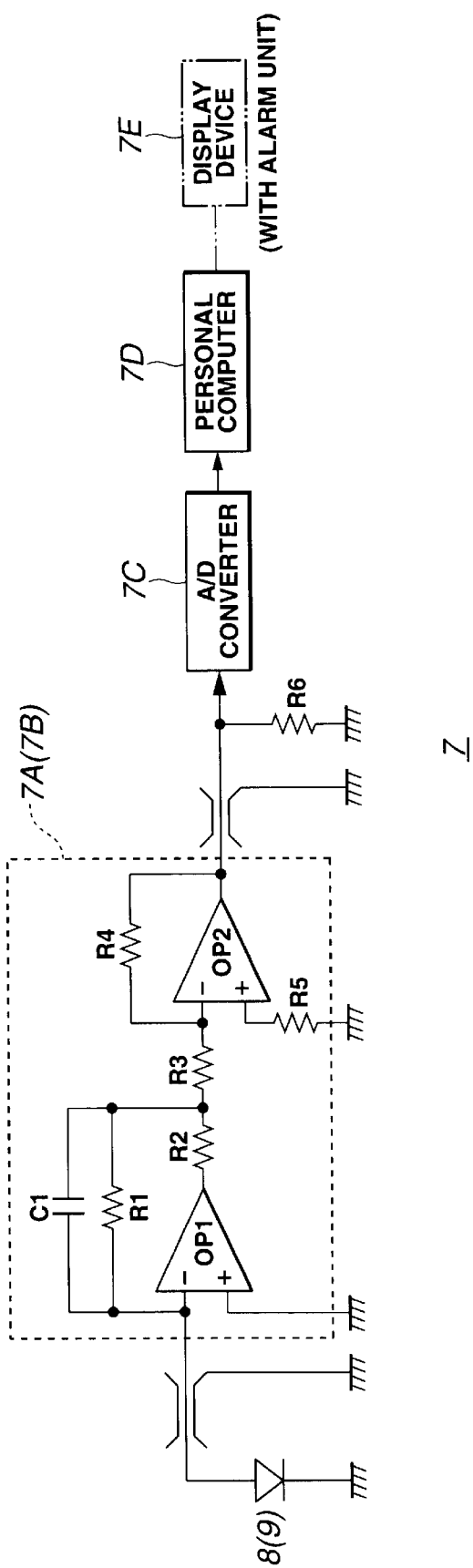

METHOD AND APPARATUS FOR DETERMINING QUALITY OF WELDING AT WELD BETWEEN WORKING MATERIAL PIECES

BACKGROUND OF THE INVENTION a) Field of the invention

The present invention relates generally to a technique for guaranteeing a quality of YAG laser welding on working material pieces by means of a laser welding, for example, a YAG laser in an assembly line such as a vehicular body assembly line.

The present invention, more particularly, relates to method and system for determining a quality of welding at a weld between working material pieces which not only determine whether the welding gives a good result or bad result but also detect variations in parameters such as to give a large influence on the welding quality to identify what is a cause of the bad result (failure) in the welding. The present invention is applicable to a YAG laser welding adaptive control system adopting an adaptive control for the whole YAG laser welding system.

b) Description of the related art

Important parameters such as to be directly related to a welding quality in a YAG laser welding include, for example, a laser output power at a work spot of welding, a position of focal point of the laser (so-called, focal length and which is determined by a beam diameter), a positioning accuracy of the working material pieces (the working materials to be welded together and, hereinafter called, an overlapped seam gap length), a gas flow quantity, and a welding speed.

It is desired that these welding parameters are controlled to fall their values within their predetermined allowable ranges during the welding using the YAG laser. However, during a sequential welding of large-sized working material pieces such as those found in a vehicular body assembly line, it is impossible to avoid completely large variances (or large deviations) in the welding quality for the respectively welds of the working material pieces from a perfect welding quality and large variances (or large deviations) of the welding parameters based on a stopped positional accuracy of each working material piece to be welded by means of a work material piece carrying device. It cannot be said that a sudden, unexpected weld failure does not occur.

A method for measuring a physical quantity such as light or sound which is generated during the laser welding to estimate the welding quality has been proposed as a monitoring technique of the laser welding quality.

For example, a Japanese Patent Application First Publication No. Heisei 10-6051 published on Jan. 13, 1998 exemplifies a method for measuring a frequency distribution of a plasma light emitted during the laser welding using a $CO_2$ (carbon dioxide) laser so as to estimate the welding quality at each weld.

On the other hand, for the YAG laser, an English paper on development items of a German company called Laser Zentrum Hannover e. V. discloses Process Control During Nd: YAG Laser Beam Welding published on June, 1995. In this English paper, a monitoring system has been commercialized which detects an intensity of an emission of the plasma light (it is noted that, since an ionization percentage is low in the YAG laser welding, it is naturally correct to use a term of a plume in place of the term of plasma but it is normally called plasma) and compares the detected waveform with a normal waveform prepared when the good quality of welding has been obtained.

SUMMARY OF THE INVENTION

However, in the above-described previously proposed monitoring system disclosed in the English paper, only the intensity of plasma light generated from the weld of the working material pieces is detected to determine the quality of welding and the determination of whether the result of welding at the weld is good or bad is dependent upon whether the detected plasma waveform falls within a range set at a constant percentage to a plasma waveform obtained when the result of welding at the same weld has been determined to be good and stored as a reference waveform.

Hence, even if the good or bad result of the welding quality can be determined, a cause of the bad result of welding (failure in welding) is not yet identified.

Consequently, in order to eliminate the failure of welding, the welding parameters are not yet automatically be controlled according to the previously proposed monitoring method to fall the welding parameters within the allowable limits and a countermeasure to cope with the failed welding is not yet made.

To eliminate such a problem as described above, there is a demand in the YAG laser welding technique to develop the monitoring technique which can also identify the cause of the failure of welding in addition to the determination of whether the result of welding is good or bad.

It is, therefore, an object of the present invention to provide method and apparatus for determining a quality of welding at a weld between working material pieces which can determine a good or bad result of welding and which can identify the cause of the failure when the quality of welding is determined to be the bad result.

As a result of scrutiny on information signal from the weld during the YAG laser welding to solve the above-described problem, it was discovered that when, in addition to the intensity of the plasma light (visible light region) generated from a high-temperature metal vapor developed on the weld (as described above, although the plasma is not accurate in terminology but the plume exactly corresponds to the phenomenon of the metal vapor, hereinafter, called plasma), the intensity of a reflected light of the YAG laser which is reflected from the weld without an absorption of the radiated light on the weld on one of the working piece materials was individually measured and signal levels of both components of a low-frequency component (DC component) equal to or below approximately 100 Hz and a high-frequency component (AC component) which is involved with a large time variation up to about 10 KHz with the DC component intensity as a fundamental frequency component intensity were respectively detected, signal information of a total of four kinds of the information signals, viz., the DC component and AC component of the plasma light emission intensity and those of the YAG laser reflected light intensity indicated their characteristic behaviors to the variations in the welding parameters, for example, the laser.output (output power), the focal point position (defined as a focal length), overlapped seam gap length, and so forth. It was determined that the quality of welding at the weld can indirectly be determined (tendency control) by monitoring the variations in the four kinds of signal information and an accurate estimation from which parameter a cause of failure in welding quality is derived can be made to eliminate the cause of failure in welding.

The above-described object can be achieved by providing a method for determining a quality of welding at a weld between working material pieces, comprising: detecting an emission intensity of a visible light emitted from the weld during a laser welding using a laser device emitting a laser having a wavelength falling in a range of the wavelengths of near infra-red rays; outputting a first detection signal indicating the light emission intensity of the visible light; detecting an intensity of a reflected light of the laser from the weld during the laser welding; outputting a second detection signal indicating the light intensity of the reflected light; analyzing frequencies of the first and second detection signals; and determining whether a result of the laser welding falls in a favorable range of welding and, at the same time, identifying a cause of welding failure of the weld if determining that the result of the laser welding falls out of the favorable range on the basis of signal intensities of a first frequency component of each of the first and second detection signals lower than an arbitrary frequency in a range from 50 Hz to 200 Hz and of a second frequency component of each of the first and second detection signals higher than the arbitrary frequency.

The above-described object can also be achieved by providing an apparatus for determining a quality of welding at a weld between working material pieces, comprising: a first detector to detect an emission intensity of a visible light emitted from the weld during a laser welding using a laser device emitting a laser having a wavelength falling in a range of the wavelengths of near infra-red rays and to output a first detection signal indicating the light emission intensity of the visible light; a second detector to detect an intensity of a reflected light of the laser from the weld during the laser welding and to output a second detection signal indicating the light intensity of the reflected light; and a measuring device to analyze frequencies of the first and second detection signals, to determine whether a result of the laser welding falls in a favorable range of welding, and to identify a cause of welding failure of the weld if determining that the result of the laser welding falls out of the favorable range on the basis of signal intensities of a first frequency component of each of the first and second detection signals lower than an arbitrary frequency in a range from 50 Hz to 200 Hz and of a second frequency component of each of the first and second detection signals higher than the arbitrary frequency.

BRIEF DESCRIPTION OF THE DRAWINGS

FIG. 1C is a circuit block diagram of an example of a measuring device shown in FIG. 1A.

DETAILED DESCRIPTION OF THE PREFERRED EMBODIMENTS

Reference will hereinafter be made to the drawings in order to facilitate a better understanding of the present invention.

Figure 1A:
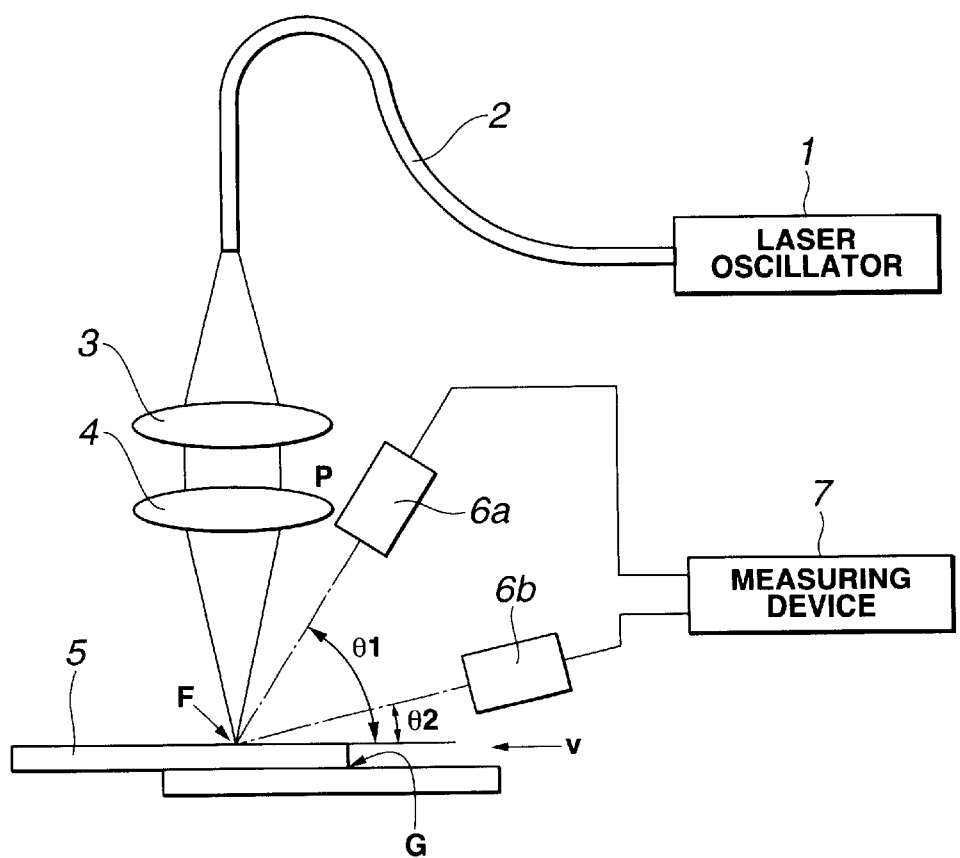
FIG. 1A is a schematic configuration view of an example of a YAG laser welding system to carry out a preferred embodiment of a method for monitoring a quality of welding at a weld between working material pieces (two sheets of steel plates) according to the present invention.

FIG. 1A shows an example of a configuration of a YAG laser welding system to carry out a preferred embodiment of a method for monitoring a quality of welding at a weld between working material pieces according to the present invention.

The welding system shown in FIG. 1A includes a YAG laser oscillator 1.

A laser light generated by means of the laser oscillator 1 is introduced into a light condensation optical system by means of an optical fiber 2, is converted into mutually parallel light beams by means of a collimation lens 3, and is condensed on a surface of partially overlapped working material pieces 5 to be welded by means of a condensing lens 4 to undergo a butt welding operation.

On the other hand, a first photo sensor 6a is disposed at a first position at which an angle of elevation θ1 from the surface of the working material pieces 5 to be welded indicates 60° and a second photo sensor 6b is disposed at a second position at which the angle of elevation θ2 from the same surface indicates 10°.

These first and second photo sensors 6a and 6b convert an intensity of a plasma light (visible light) emitted from the weld and the intensity of a reflected light of the YAG laser without an absorption into the weld of the working material pieces 5 after an irradiation of the plasma light on the same working material pieces 5 into electrical signals, respectively. It is noted that each photo diode 8 (9) has no spectral sensitivity to the laser beams.

The converted electrical signals from the respective photo sensors 6a and 6b are supplied to a measuring device 7 including a corresponding one of pre-amplifiers 7A (7B), an analog-to-digital (A/D) converter 7C, and a personal computer 7D having a display device 7E and an alarm unit, as shown in FIG. 1C.

Figure 1B:
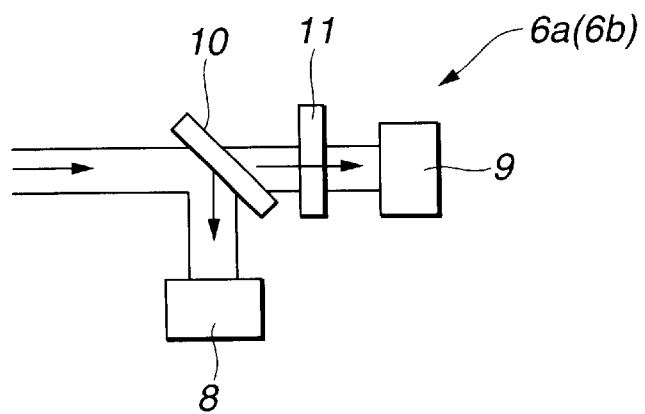
FIG. 1B is a schematic explanatory view of an example of an internal structure of each photo sensor shown in FIG. 1A.

Each of the first and second photo sensors 6a and 6b, as shown in FIG. 1B, includes: two photo diodes 8 and 9 (for example, each of G1115); a dichroic mirror 10; and an interference filter 11 which transmits only a light beam having a wavelength of 1064 nm±10 nm therethrough.

In the first sensor 6a and the second sensor 6b, the light beam from the weld incident from a left side in Fig. 1B is selected in accordance with a wavelength by means of the dichroic mirror 10. That is to say, the visible light equal to or below the wavelength of 500 nm is reflected by means of the dichroic mirror 10 and an interference filter 11 transmits light beams having only a wavelength of 1064 nm±10 nm therethrough.

For example, the pre-amplifier 7A (7B) includes, as shown in FIG. 1C, a first operational amplifier OPI whose minus input end is connected to the corresponding one of the photo diodes 8 (9) of each photo sensor 6a (6b) via a shielded wire and is connected to a first capacitor C1 and a first capacitor R1 and whose output end is connected to a second resistor R2, and a second operational amplifier OP2 whose minus input end is connected to the second resistor R2 via a third resistor R3 and connected to a fourth resistor R4, whose plus input end is connected to a fifth resistor R5, and whose output end is connected to a sixth resistor R6 and the A/D converter 7C. The first capacitor C1 and the first resistor RI are connected to a junction between the second and third resistors R2 and R3.

The visible light beams, each having a wavelength equal to or below 500 nm, are reflected on the dichroic mirror 10 and are introduced to face against the one photo diode 8. The visible light beams are then converted into an electrical signal and its magnitude is detected (as will be described below). On the other hand, an infra-red light beam from among the incident lights from the weld is transmitted into the dichroic mirror 10. Thereafter, only the YAG laser light having the wavelength of 1.06 μm is transmitted into the interference filter 11 and is introduced into the other photo diode 9. The YAG reflected light is converted into the electrical signal and is inputted to the measuring device 7.

It is noted that, in the embodiment, four pre-amplifiers 7A (7B) for four photo diodes 8 (9) are connected to the personal computer 7D via the corresponding A/D converter 7C.

The plasma emitted light intensity indicative signal and the YAG reflected light intensity indicative signal detected by means of the first sensor 6a and the second sensor 6b are divided into a low-frequency component (DC component) equal to or below 100 Hz and a high-frequency component (AC component) exceeding 100 Hz up to 10 kHz as shown by FIGS. 8A, 8B, 9A, and 9B. Their intensities are detected thereby, respectively.

Figure 2:
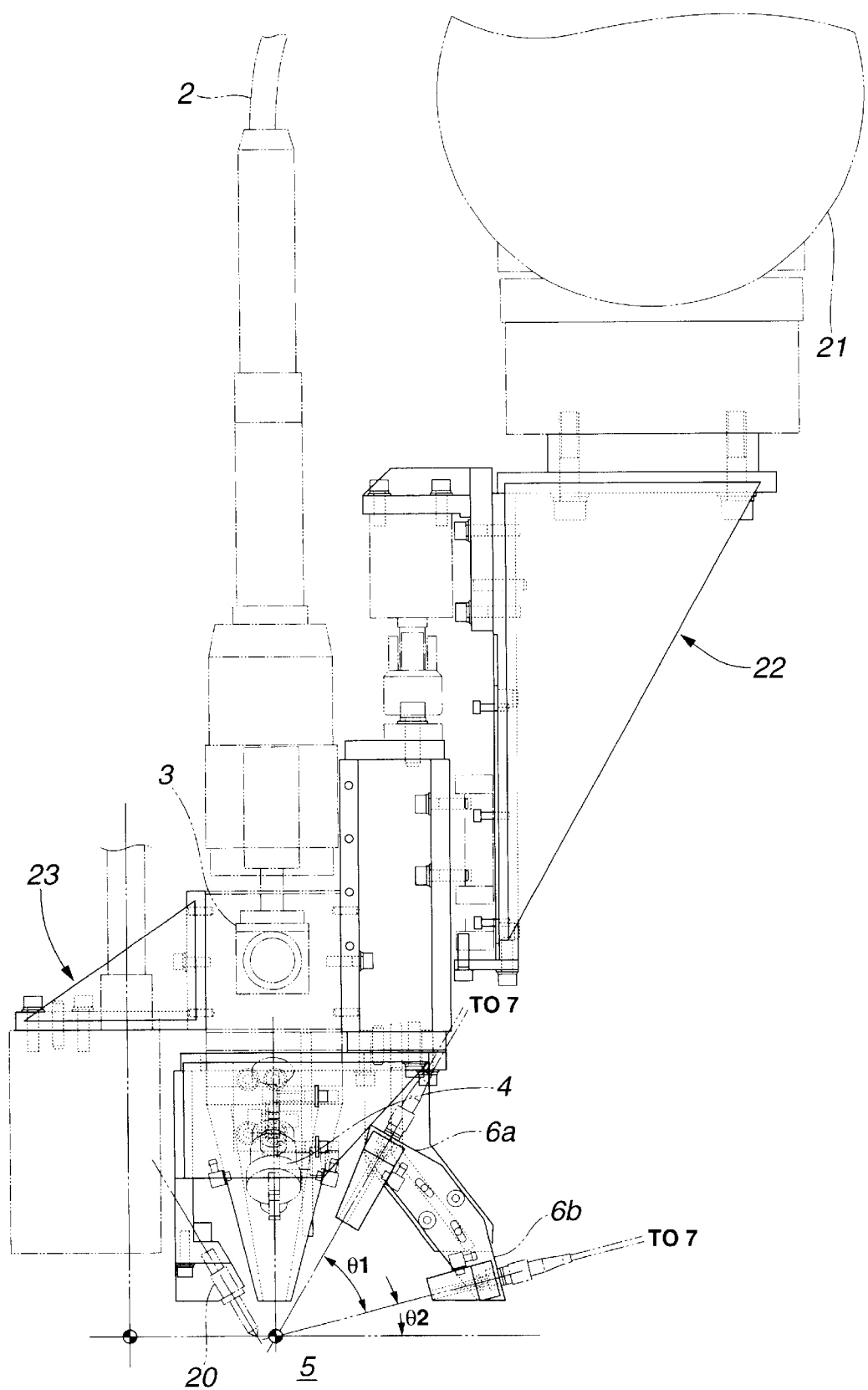
FIG. 2 is an elevation view f a YAG laser welding system to which the preferred embodiment of the welding quality monitoring system is applicable for explaining a positional relationship between a head of a YAG laser, the photo sensors, and the weld shown in FIG. 1A.

FIGS. 2 shows a detailed configuration view of the YAG laser welding system to carry out the monitoring method in the preferred embodiment according to the present invention.

In FIG. 2, 21 denotes an articulation of a robot manufactured by FANUC of No. S430, 22 denotes a tilt mechanism for a laser head having the collimation lens 3 and the condenser lens 4, 20 denotes a tracking sensor, and 23 denotes a tracking mechanism. The first and second photo sensors 6a and 6b are attached to the laser head so as to have the angle of elevations of θ1 and θ2 with respect to the weld. The tilt mechanism 22 and the tracking mechanism 23 having the tracking sensor 20 are also exemplified by a U.S. Pat. No. 5,925,268 issued on Jul. 20, 1999(, the disclosure of which is herein incorporated by reference).

FIGS. 3A through 5D show examples of results of detection of the signal intensities when two sheets of steel plates 5 shown in FIG. 1A are tightly attached to each other and the representative welding parameters are varied.

In the results of detection shown in FIGS. 3A through 5D, with the two sheets of steel plates 5 brought in close contact with each other (a gap length G at an overlapped seam was zero), the collimation lens 4 of the focal point distance of 200 mm used to adjust the focal point of the YAG laser (so-called, a focal length F) to the surface of the working material pieces 5 (a focal point position F was zero so that the focal point was just at the weld), the output power P at a work spot of 3 KW, and the welding speed v of 4 m/min., the two sheets of the steel plates 5, each plate thickness of 0.8 mm, were overlapped as shown in FIG. 1A.

FIGS. 3A through 5D, under these experiment conditions, show variations in respective signal components when the output power at the work spot, the focal point position, and overlapped seam gap length were varied respectively, which are welding parameters having high possibility of variations during the welding operation by the YAG laser welding system shown in FIGS. 1A and IC. These variables are the representative welding parameters.

In details, FIGS. 3A through 3D show the lower output power at the work spot, the DC component of the plasma light emission intensity, the AC component of the plasma light emission intensity, the DC component of the YAG laser reflected light intensity, and the AC component of the YAG laser reflected light intensity. In FIGS. 3A through 3D, a mark □ represents the detection signal from the first sensor 6a which gives the angle of elevation of 60° from the surface of the working material pieces 5 and a mark ○ represents the detection signal from the second sensor 6b which gives the angle of elevation of 10°.

Furthermore, FULL PENE. denoted in FIGS. 3A through 5D indicates a range of a provision of a full penetration of welding to a rear surface of the two sheets of the steel plates 5 that gives a favorable range of welding (good quality of welding) and is denoted by a thin mesh.

As shown by FIGS. 3A through 5D, it was confirmed that together with the variation in the work spot output power, these eight kinds of -the detection signals indicating respectively characteristic variations. It is appreciated from FIG. 3D that if the signal in FIG. 3D which varies largely from the criterion, viz., the AC components of the YAG laser reflected light intensity were used, the variation in the output power at the work spot could accurately be grasped.

FIGS. 4A through 4D show variations in the respective detection signals together with variations in respective focal point positions. As shown in FIGS. 4A through 4D, although, each of the DC component of the plasma light emitting efficiency, the AC component of the plasma light emitting efficiency, and the DC component of the YAG reflected light emitting efficiency in FIGS. 4A through 4C, indicates such a variation characteristic that the zero focal point position is a local minimum, the AC component of the detection signal of the YAG reflected light intensity shown in FIG. 4D indicated such a variation characteristic that the zero focal point position is a local maximum. Hence, it becomes possible to detect a variation in the focal point position by combining these two characteristics.

It is noted that plus numerical values on the focal point position represent that the focal point position of the YAG laser is placed at an upper side with respect to the position of the working material pieces (two sheets of steel plates 5) shown in FIG. 1A and minus numerical values thereof is placed below the surface of the working material pieces 5.

In addition, FIGS. 5A through 5D show variations in the respective detection signals together with the variation in the overlapped seam gap length of the working material pieces 5.

Figure 5A:
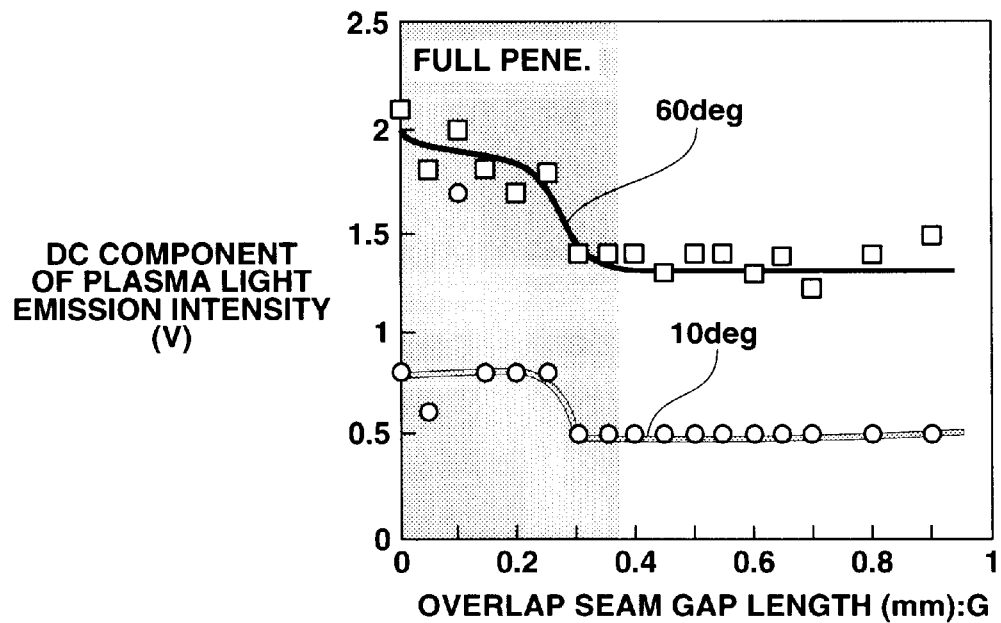
FIG. 5A is a plotted characteristic graph representing the DC components of the intensity of the emission of the plasma light with respect to a gap length of an overlapped seam.
Figure 5B:
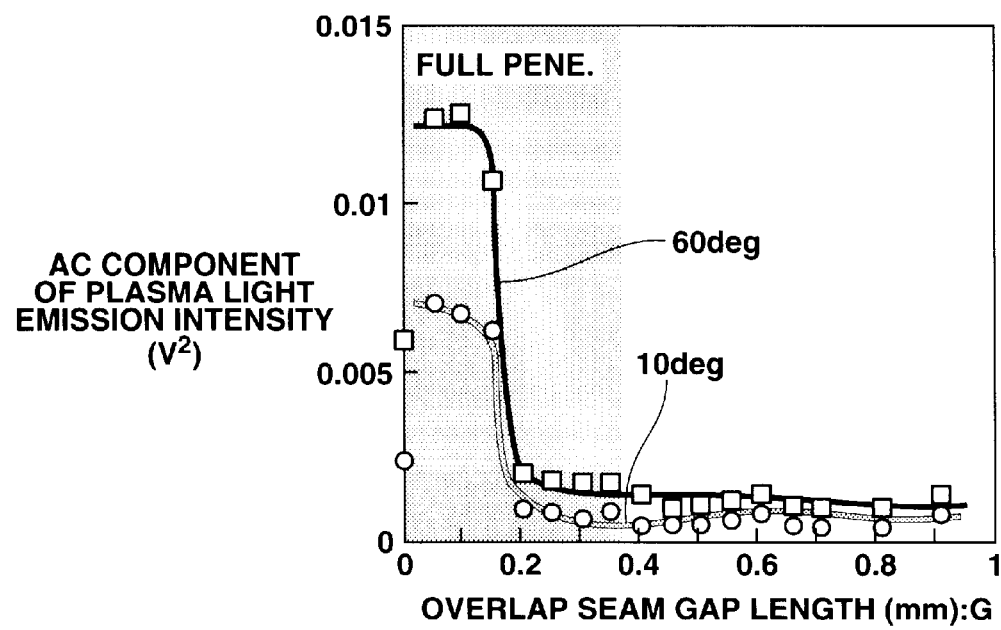
FIG. 5B is a plotted characteristic graph representing the AC components of the intensity of the emission of the plasma light with respect to the gap length of the overlapped seam.

From among these shown in-Figs. 5A through 5D, the AC component of the detection signal from the plasma light emitting efficiency shown in FIG. 5B varied most largely. The variation in the overlapped seam gap length can accurately be detected by grasping such a signal level variation as described above.

Figure 3A:
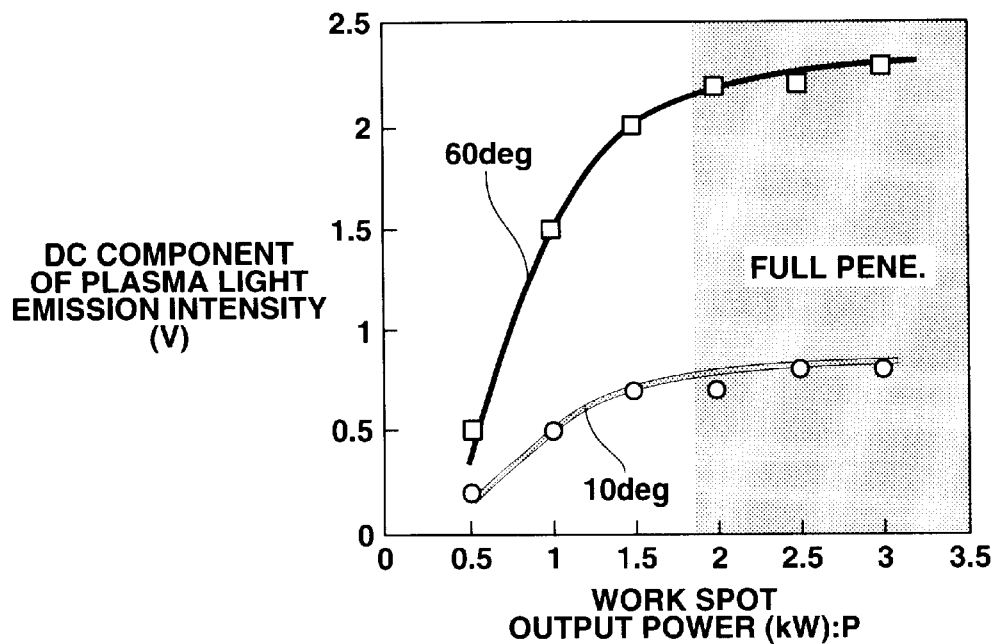
FIG. 3A is a plotted characteristic graph representing DC components of an intensity of an emission of light of a plasma derived from the respective photo sensors with respect to an output power of a YAG laser at a work spot.
Figure 3B:
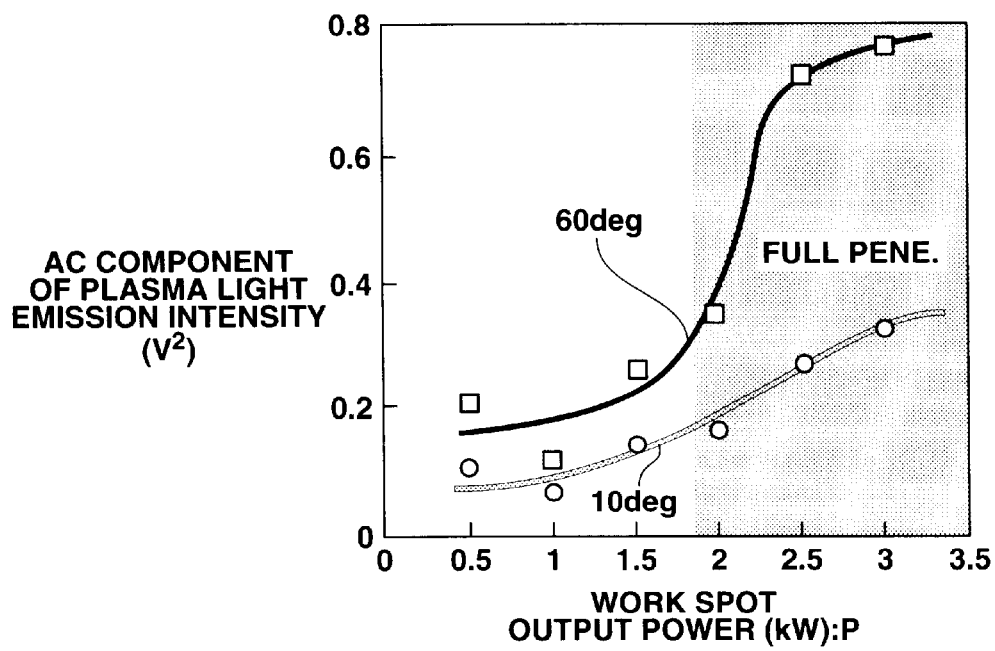
FIG. 3B is a plotted characteristic graph representing AC components of an intensity of an emission of light of the plasma derived from the respective photo sensors with respect to the work spot output power of the YAG laser.
Figure 3C:
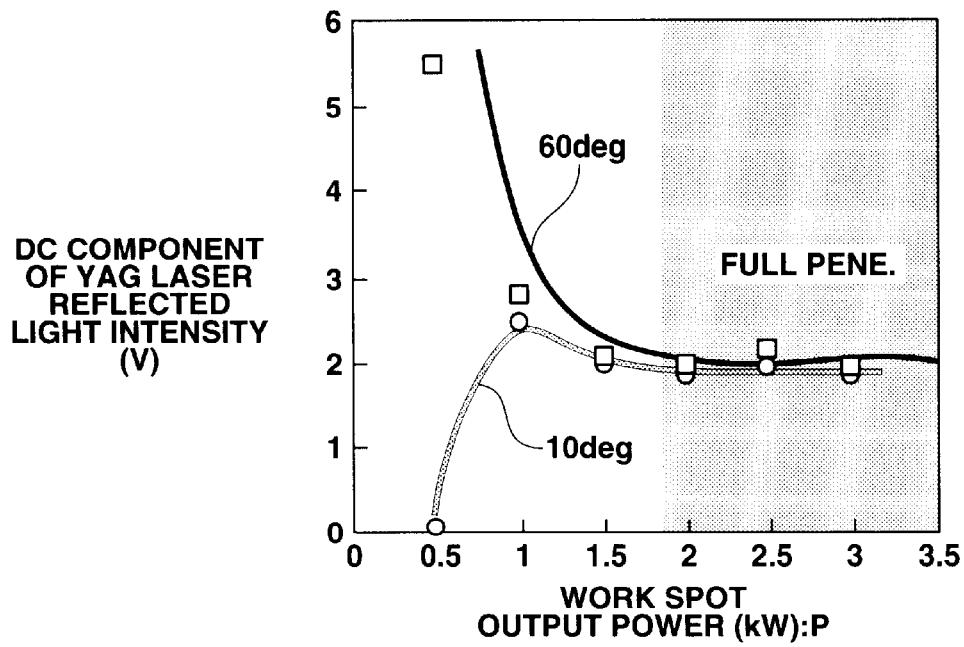
FIG. 3C is a plotted characteristic graph representing DC components of a reflected light of the plasma with respect to the output power of the YAG laser at the work spot.
Figure 3D:
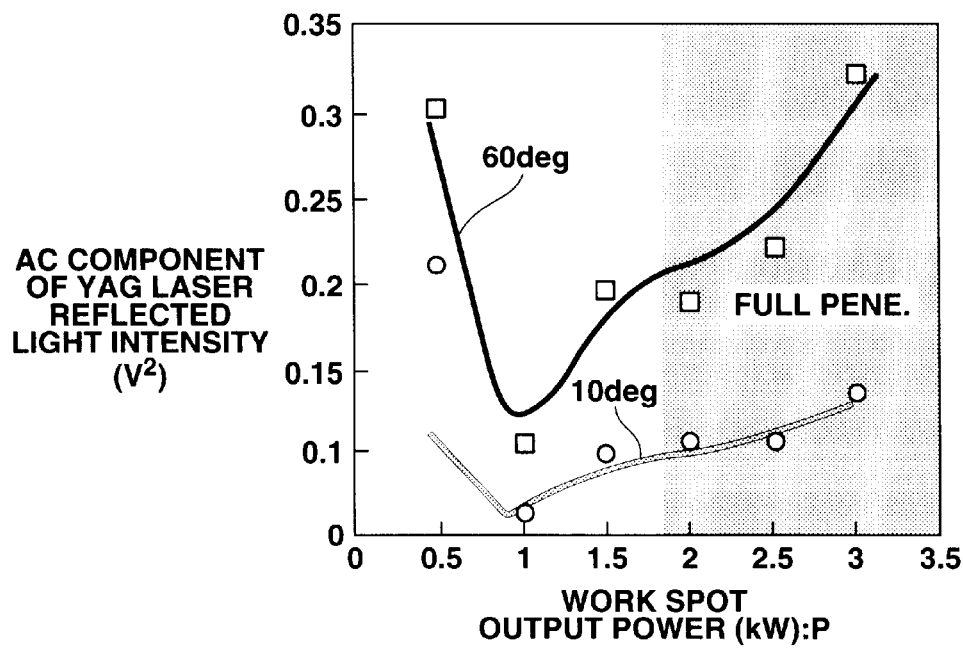
FIG. 3D is a plotted characteristic graph representing AC components of a reflected light of the plasma derived from the respective photo sensors with respect to the output power of the YAG laser at the work spot.
Figure 4A:
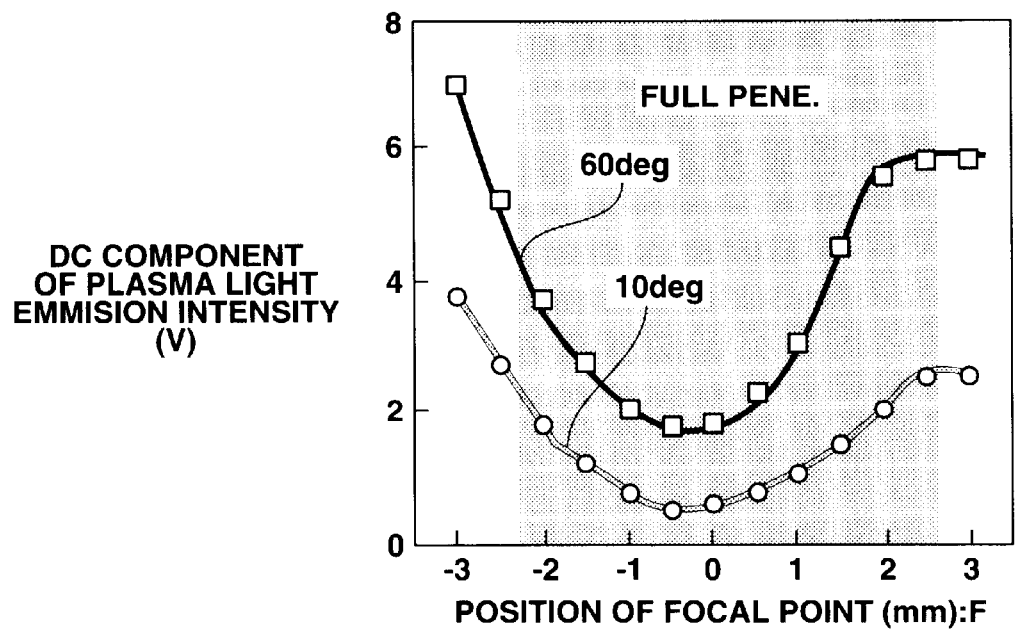
FIG. 4A is a plotted characteristic graph representing the DC components of the intensity of the emission of the plasma light with respect to a position of a focal point of the YAG laser.
Figure 4B:
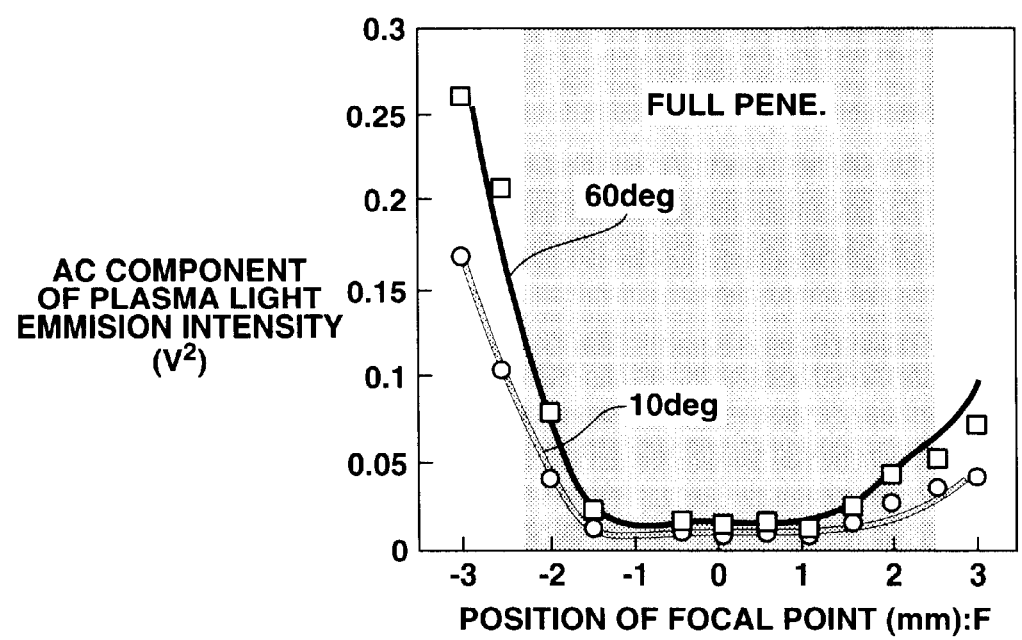
FIG. 4B is a plotted characteristic graph representing the DC components of the intensity of the emission of the plasma light with respect to the position of the focal point (the focal length) of the YAG laser.
Figure 4C:
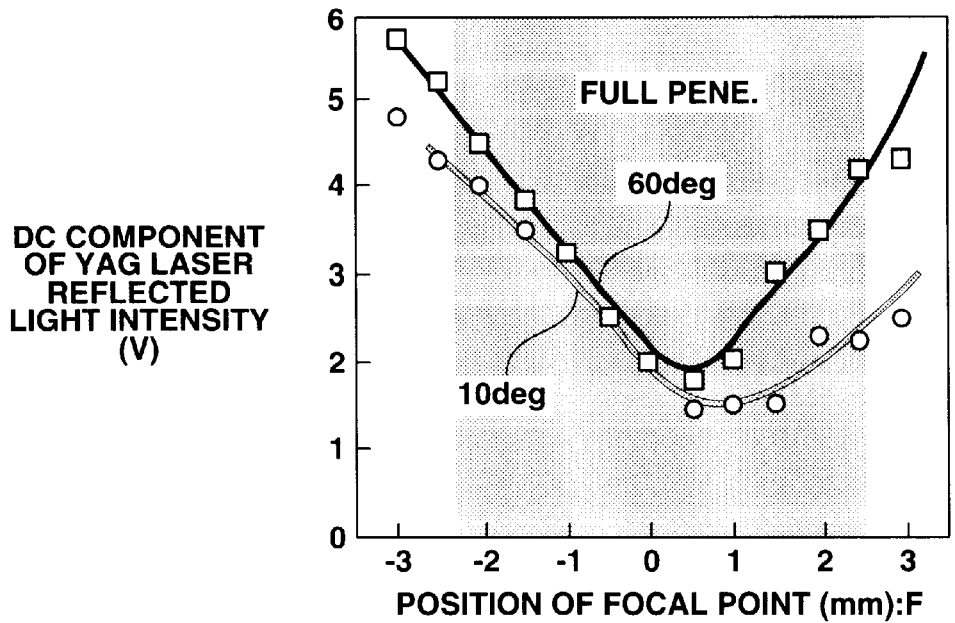
FIG. 4C is a plotted characteristic graph representing the Ac components of the intensity of the reflected light of the plasma with respect to the position of the focal point (focal length) of the YAG laser.
Figure 4D:
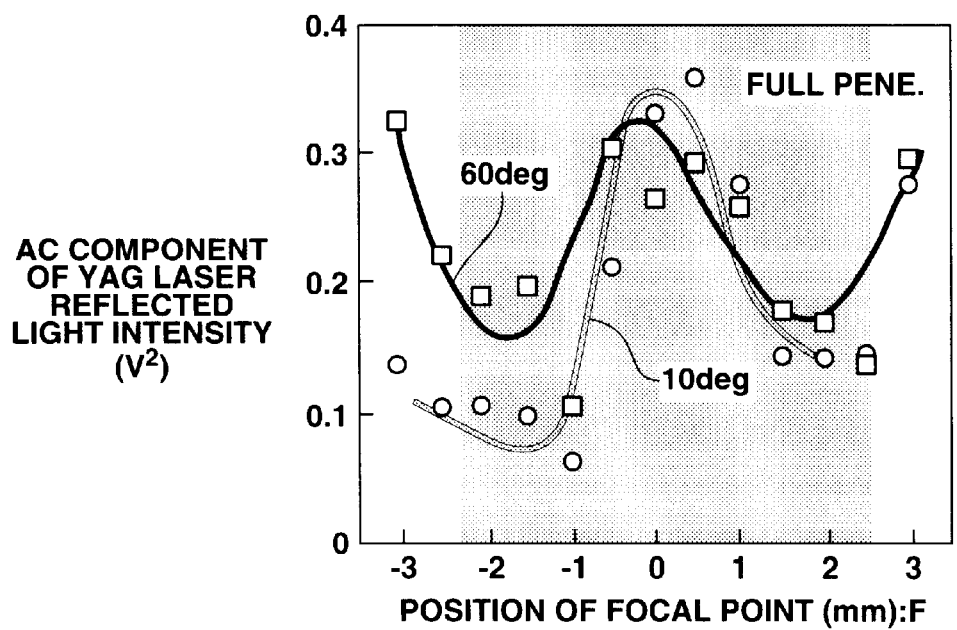
FIG. 4D is a plotted characteristic graph representing the DC components of the intensity of the emission of the plasma light with respect to the position of the focal point (focal length) of the YAG laser.
Figure 5C:
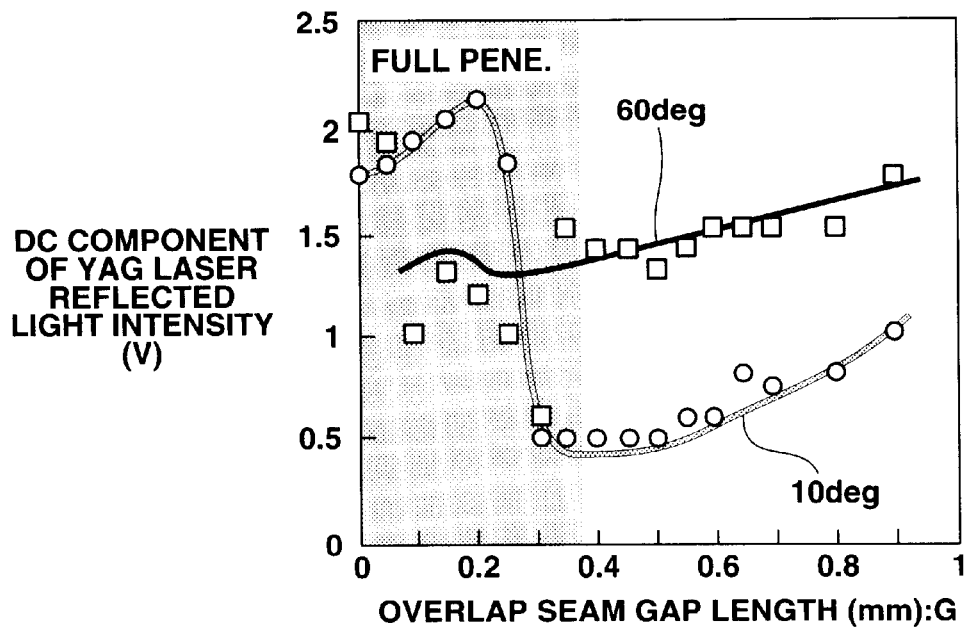
FIG. 5C is a plotted characteristic graph representing the DC components of the intensity of the reflected light of the plasma with respect to the gap length of the overlapped seam.
Figure 5D:
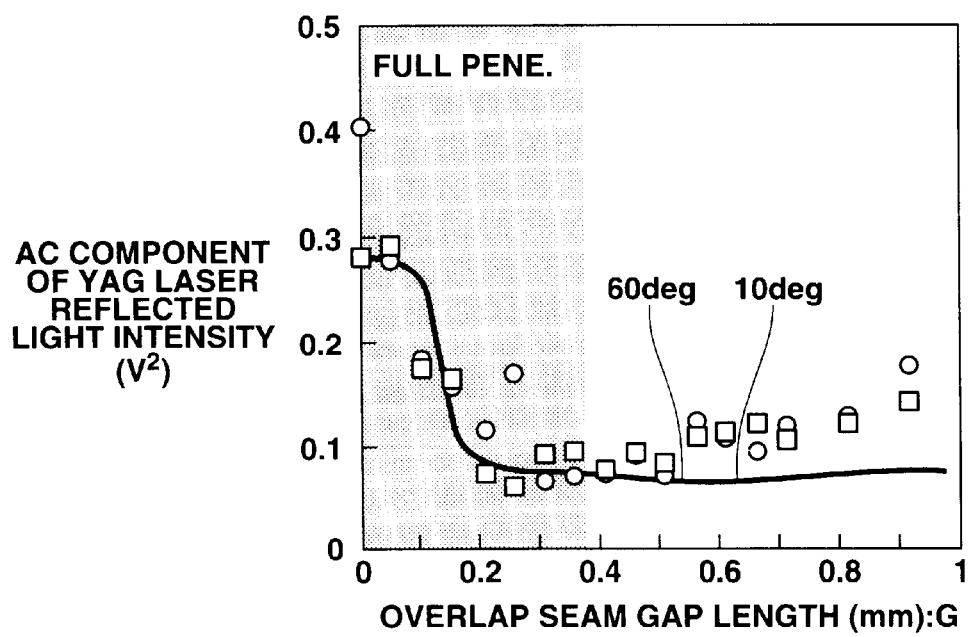
FIG. 5D is a plotted characteristic graph representing the AC components of the intensity of the reflected light of the plasma with respect to the gap length of the overlapped seam.
Figure 6:
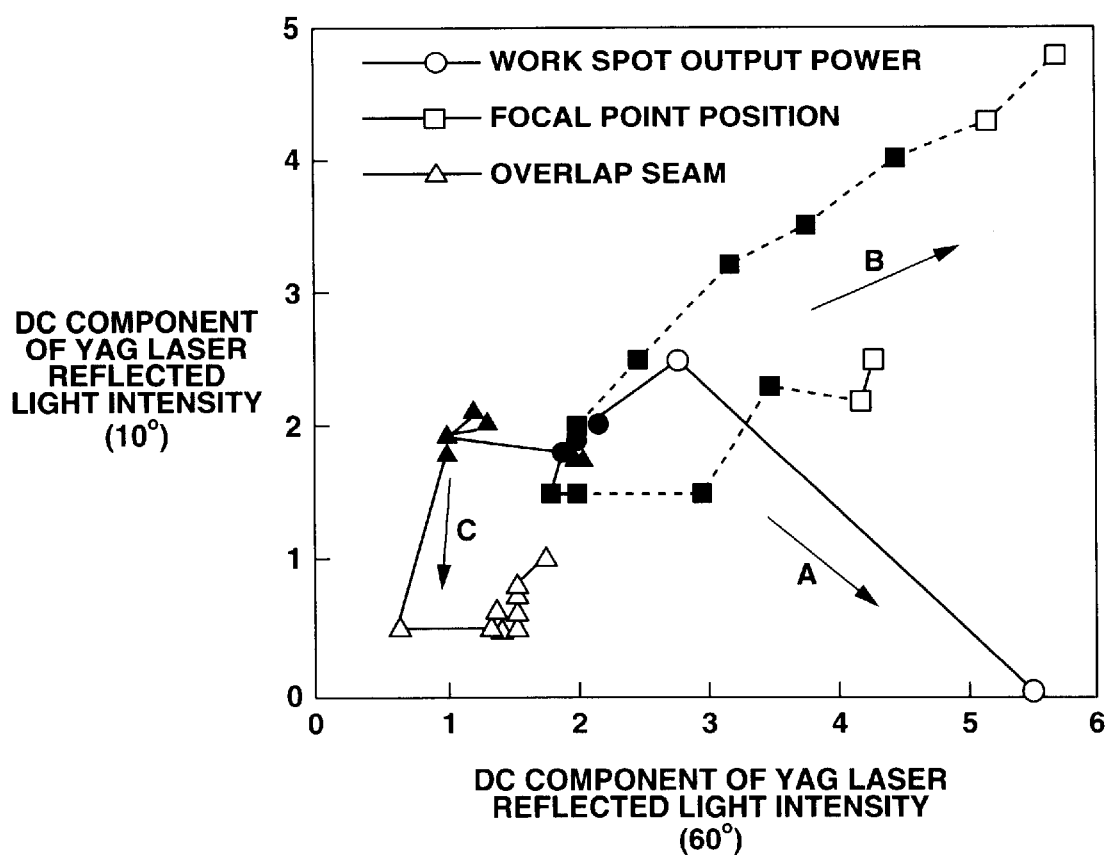
FIG. 6 is a two-dimensionally plotted characteristic graph representing variations of the DC component signals of the reflected light intensity of plasma detected by means of the respective photo sensors and based on a variation in each welding parameter.

FIG. 6 shows a control chart representing two-dimensional sequential plotted graphs for the respective welding parameters of the output powers at the respective work spots P, the focal length F, and overlapped seam gap length G derived from the data shown in FIGS. 3C, 4C, and 5C, a lateral axis thereof indicating the signal intensity (so-called, a signal level) of the DC component of the YAG laser reflected light intensity from the first sensor 6a (the angle of elevation is 60°) and a longitudinal axis thereof indicating the signal intensity of the DC component of the YAG laser reflected light intensity from the second sensor 6b (the angle of elevation is 10°). In FIG. 6, a mark ○ denotes the output power at the work spot P, a mark □ denotes the focal length F, a mark Δ denotes the gap length of the overlapped sensor G, and marks of ●, ▼, and ■ denote plotted points falling in the favorable ranges for the individual parameters.

In details, as shown in FIG. 6, the favorable welding ranges according to the respective welding parameters are located generally on a center position of FIG. 6.

When each parameter is varied in a direction toward which the quality of welding indicates the bad result of detection as shown by the arrow marked A, B, and C in FIG. 6. In addition, each parameter has a different direction. Hence, if the movement direction is grasped, it becomes possible to estimate which welding parameter is the cause of failure in welding from the movement direction.

For example, if the plotted value is moved in the arrow-marked direction A shown in FIG. 6, the cause of failure is due to the variation in the output power at the work spot P, if the plotted value is moved in the arrow-marked direction B shown in FIG. 6, the cause of failure is due to the variation in the focal length F, and if the plotted value is moved in the arrow-marked direction C shown in FIG. 6, the cause of failure is due to an abnormality in the gap length G of the two sheets of steel plates.

Hence, if a control range in which the favorable quality of welding is obtained is set at the center position of FIG. 6, it becomes possible to issue an alarm to inform an operator of the failure in the welding at the work spot using an alarm unit of the results of detection during the welding operation indicates that it is out of the control range and to display one of the welding parameters to be checked through a display screen indicated by FIG. 6 in the personal computer 7D in FIG. 1C according to which direction the welding parameter plotted value is moved. Furthermore, if the results of detection indicates that it is out of the control range, a full automatic system such as to automatically correct the corresponding parameter may be achieved.

Although, in the above-described embodiment, the representative welding parameters include the laser output power of the work spot P, the focal length F, and the gap length of the overlapped seam G, other welding parameters such as the welding speed v and gas flow quantity may be plotted to derive their corresponding data and the same control of the quality of welding can be achieved.

In addition, for the control chart shown in FIG. 6, the longitudinal and lateral axe may arbitrarily be selected from the eight kinds of detection signals (∵ $_8C_2=28$ combinations). From among those of 28 combinations, an optimum combination for the monitoring and control of welding quality may be selected.

Figure 7A:
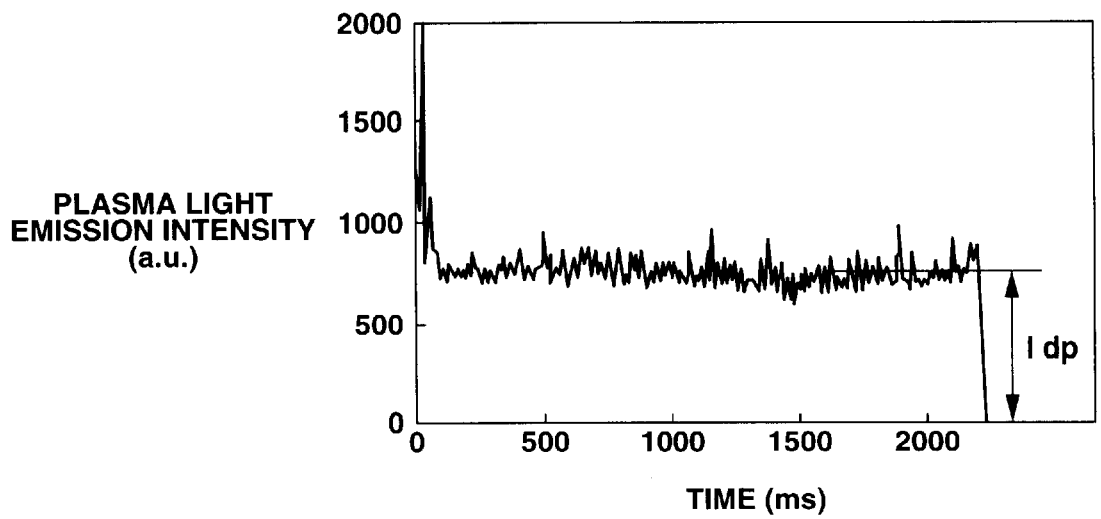
FIG. 7A is a characteristic graph representing an example of a low-frequency component signal (DC component) of the intensity of the plasma light emission with respect to time.
Figure 8A:
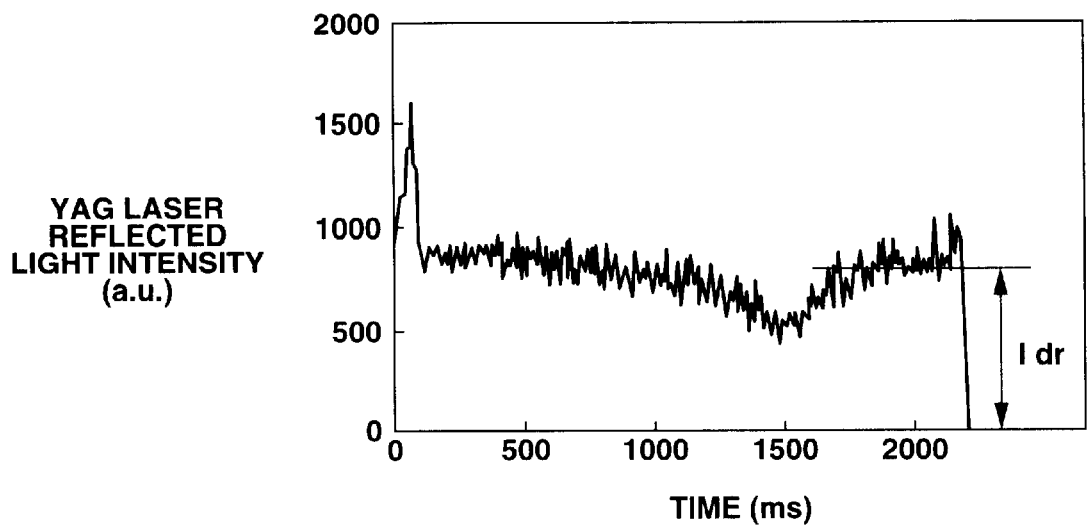
FIG. 8A is a plotted characteristic graph representing an example of the low-frequency component signal of the intensity of the plasma reflected light with respect to time.

FIGS. 7A and 8A show examples of the detection signal representing the plasma light emission intensity generated from the work spot (the surface of the working material pieces 5 to be welded) during a spot welding using the YAG laser shown in FIG. 1A and that representing the plasma reflected light intensity without the absorption into the working material pieces 5.

In FIGS. 7A and 8A, I dp and Idr are defined as the DC components which are average values of the detection signals with respect to a time duration, for example, approximately 1000 milliseconds.

Figure 7B:
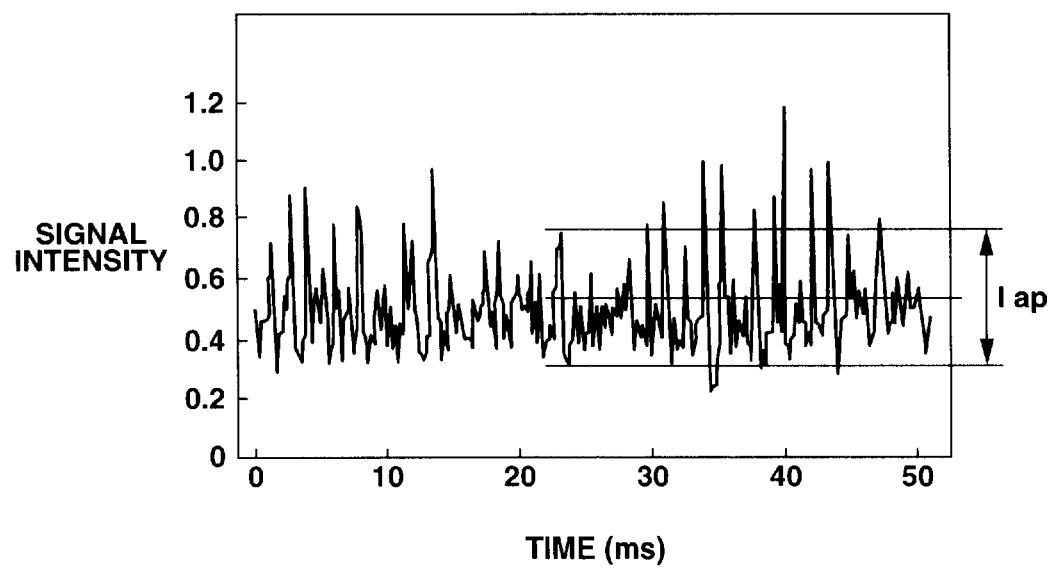
FIG. 7B is a characteristic graph representing an example of a high-frequency component signal (AC component) of the intensity of the plasma light emission with respect to time.
Figure 8B:
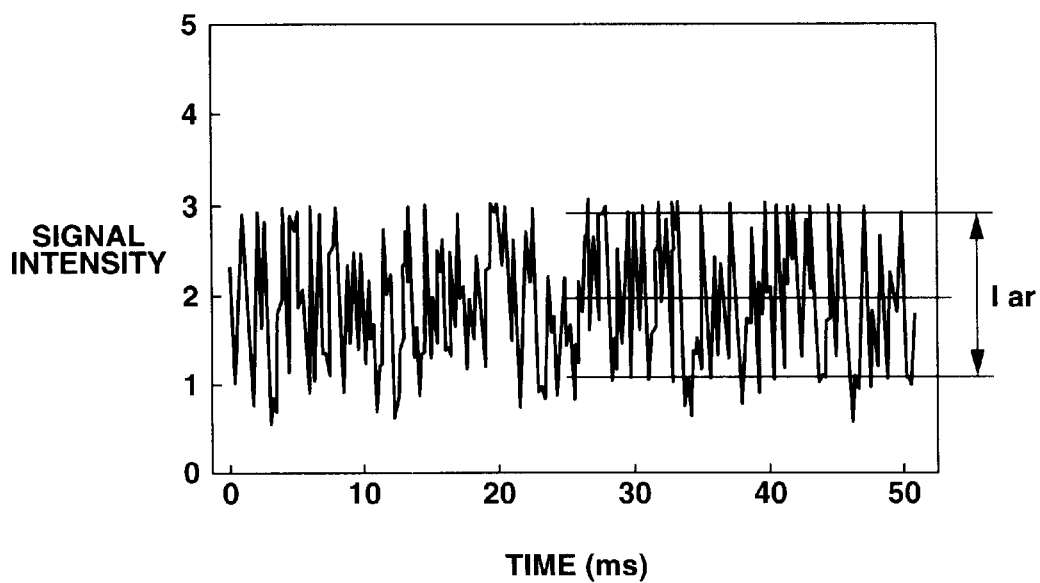
FIG. 8B is a plotted characteristic graph representing an example of the high-frequency component signal of the intensity of the plasma reflected light with respect to time.

FIGS. 7B and 8B show examples of high frequency components of the detection signal representing the plasma light emission intensity shown in FIG. 7A and of the detection signal representing the YAG reflected light intensity shown in FIG. 8A, respectively.

In FIGS. 7B and 8B, a magnitude of the high-frequency components correspond to a variation width of I ap and I ar, respectively.

For example, a square mean value of a subtraction of the average value (DC component) from each peak value is defined as the AC component.

In the monitoring method for the weld using the YAG laser described above, the quality of welding is determined on the basis of the four kinds of signal information, viz., the DC component Idp of the plasma light emission intensity, the DC component Iap of the plasma reflected light intensity, the AC component Iap of the plasma light emission intensity, and the AC component Iar of the plasma reflected light intensity.

Since these four kinds of signal information exhibits variation behaviors respectively peculiar to the variations of the respective welding parameters, one or more of the parameters which provide a cause of failure in welding can be estimated at the same time when the quality of welding at the weld is determined.

Figure 9A:
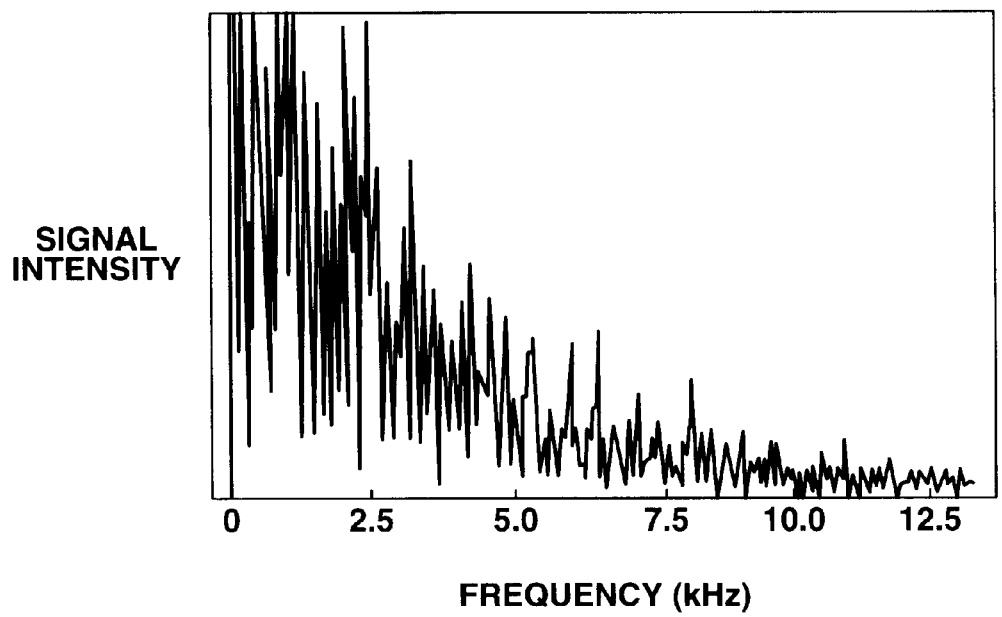
FIG. 9A is a characteristic graph representing an example of a frequency distribution of the intensity of the plasma light emission with respect to time.
Figure 9B:
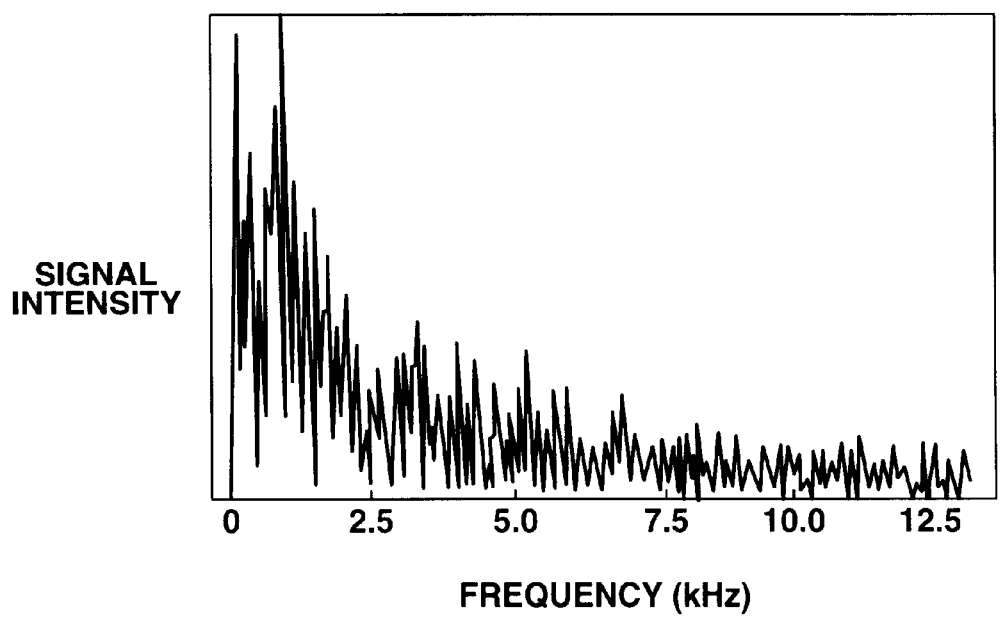
FIG. 9B is a characteristic graph representing an example of the frequency distribution of the intensity of the plasma reflected light with respect to time.

Although the frequency to divide the signal components into two, viz., the low-frequency component (the DC component) and the high-frequency component (the AC component) may arbitrarily be selected from a frequency range from 50 Hz to 200 Hz, an upper limit frequency as the high-frequency component may be set to 10 KHz since the frequency components exceeding 10 KHz are extremely few in numbers and, therefore, almost no meaning is present if the frequency component exceeding 10 KHz is detected, as appreciated from the respective frequency distributions of the plasma light emission intensity and of the YAG laser reflected light intensity shown in FIGS. 9A and 9B.

Figure 10:
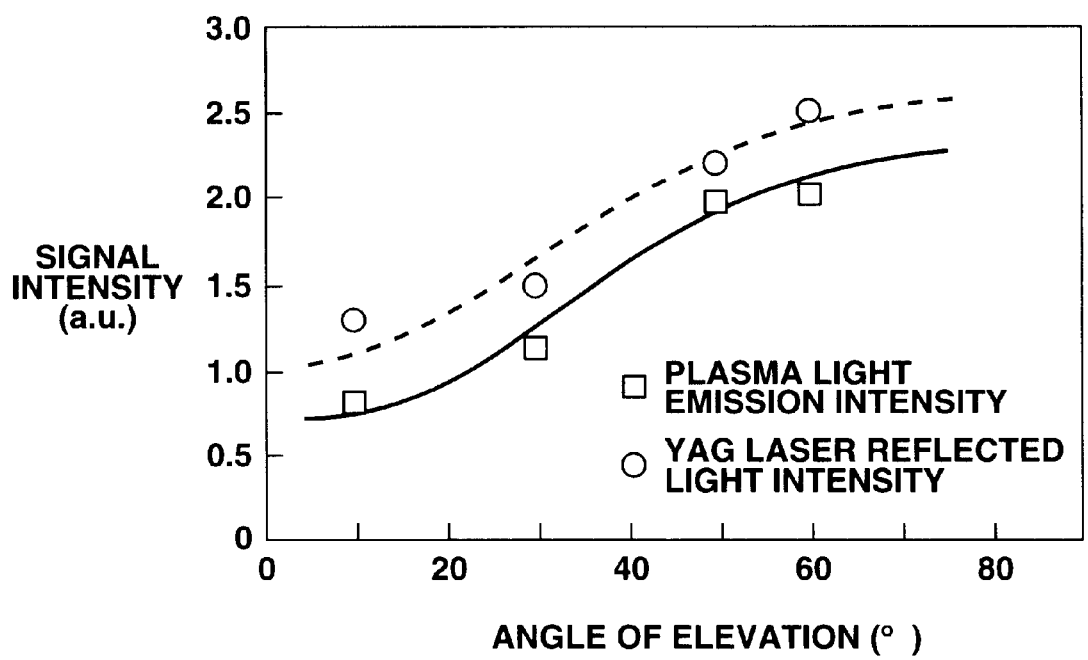
FIG. 10 is a characteristic graph representing a relationship between a signal level (the signal intensity) and each detection angle for the intensities of the YAG laser plasma light emission and of the YAG laser plasma reflected light.

FIG. 10 shows characteristic graphs representing a relationship between the angle of elevation to each of the first and second sensors from the surface of the weld of the working material pieces 5 and the signal intensities of the detection signals on the plasma light emission intensity and on the plasma reflected light intensity.

As the angle of elevation described above becomes wide, the magnitude of detection becomes high by adding the plasma light emission intensity and the YAG laser reflected light intensity from an inside of a key hole in which the welded seam is present. The key hole is defined as a hole formed by radiating the YAG laser light on the surface of the overlapped seam to be welded. When the laser light is absorbed into the inside of the key hole, the metal vapor is generated from the weld to emit light beams to be deformed. Then, when the angle of elevation exceeds 15°, an increasing tendency of the magnitude of signal becomes remarkable but the rise in the magnitude of signal (signal intensity) starts to be saturated in the vicinity to about 50°.

It is noted that a unit of each signal intensity shown in FIGS. 7A, 8A, and 10 is a.u., viz., angstrom unit and the AC components Idp and Idr shown in FIGS. 7A and 8A are derived using a frequency analyzer (FFT analyzer in a Fourier transform calculation and an inverse FFT analyzer in an inverse Fourier Transform calculation) and mathematical processing software (called "Mathematica") both installed in the personal computer. Although the FFT analyzer and the inverse FFT analyzer themselves are well known, these frequency analyzers are exemplified by a U.S. Pat. No. 6,018,689 issued on Jan. 25, 2000, (the disclosure of which is herein incorporated by reference).

Hence, since the detection of the visible light (plasma light emission) intensity and of the YAG laser reflected light intensity is carried out at the position which gives the angle of elevation from the surface of the weld to an angle value equal to or wider than 50°, the obtained signal intensity becomes remarkable so that signals, each having a high signal-to-noise (S/N) ratio can be obtained.

Since the detection of each of the plasma light emission intensity and the plasma reflected light intensity is carried out at a first position at which the angle of elevation from the weld of the working material pieces is equal to or wider than 50° and at a second position at which the angle of elevation therefrom is equal to or narrower than 15°, the signal information of the whole weld including the inside of the key hole is obtained from the sensor placed at the first position and the signal information at the surface of welding excluding the inside of the key hole is obtained from the sensor placed at the second position. If one of both signals is subtracted from the other of both signals, the result of signal subtraction indicates the information signal from the inside of the key hole. Hence, the quantity of information gives eight kinds of information which is twice the case wherein each of the sensors is placed at the position which gives the angle of elevation to 50° or wider. Hence, the determining accuracy of determining the quality of welding at the weld of the working material pieces and the identification accuracy of identifying one of the welding parameters which gives the cause of failure in welding can further be increased.

It is noted that although, in the embodiment, the YAG laser is used, a semiconductor diode laser having the light wavelength near to the YAG laser may be used.

The entire contents of a Japanese Patent Application No. Heisei 11-077505 (filed in Japan on Mar. 23, 1999) are herein incorporated by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. A method for determining a quality of welding at a weld between working material pieces, comprising:

detecting an emission intensity of a visible light emitted from the weld during a laser welding using a laser device emitting a laser having a wavelength falling in a range of the wavelengths of near infra-red rays;

outputting a first detection signal indicating the light emission intensity of the visible light;

detecting an intensity of a reflected light of the laser from the weld during the laser welding;

outputting a second detection signal indicating the light intensity of the reflected light;

analyzing frequencies of the first and second detection signals; and determining whether a result of the laser welding falls in a favorable range of welding and, at the same time, identifying a cause of welding failure of the weld if determining that the result of the laser welding falls out of the favorable range on the basis of signal intensities of a first frequency component of each of the first and second detection signals lower than an arbitrary frequency in a range from 50 Hz to 200 Hz and of a second frequency component of each of the first and second detection signals higher than the arbitrary frequency.

2. A method for determining a quality of welding at a weld between working material pieces as claimed in claim 1, wherein the detection of the intensities of the visible light emitted from the weld and of the laser reflected light are simultaneously carried out at a position having an angle of elevation thereof with respect to a surface of the weld of the working material pieces facing against the position which is equal to or wider than 50 degrees.

3. A method for determining a quality of welding at a weld between working material pieces as claimed in claim 1, wherein the detection of the light emission intensity of the visible light and the detection of the intensity of the laser reflected light are carried out at both of a first position having an angle of elevation thereof with respect to a surface of the weld of the working material pieces facing against the first position which is equal to or wider than 50 degrees and of a second position having the angle of elevation thereof with respect to the surface of the weld of the working material pieces facing against the second position which is equal to or narrower than 15 degrees.

4. A method for determining a quality of welding at a weld between working material pieces as claimed in claim 3, wherein the detection of the emission intensity of the visible light and the detection of the intensity of the reflected light are carried out at the first position having the angle of elevation thereof with respect to the surface of the weld which is approximately 60 degrees and the second position having the angle of elevation thereof with respect to the surface of the weld which is approximately 10 degrees.

5. A method for determining a quality of welding at a weld between working material pieces as claimed in claim 4, wherein the first frequency component of each of the first and second detection signal is a DC component derived by averaging each peak value of the corresponding one of the first and second detection signals and the second frequency component is an AC component derived by subtracting the average value from each peak value and taking a square mean for a result of the subtraction.

6. A method for determining a quality of welding at a weld between working material pieces as claimed in claim 5, wherein the working material pieces are two sheets of metallic plates and the weld is placed at an overlapped seam of the plates.

7. A method for determining a quality of welding at a weld between working material pieces as claimed in claim 6, wherein the determination of whether the result of the laser welding falls in the favorable range and the identification of the cause of failure in welding are carried out by preparing a control chart such that variations in the DC components of each of the first and second detection signals with respect to variations in a plurality of welding parameters have been plotted in the control chart and by determining whether the DC components of each of the first and second detection signals and by determining whether the DC components of each of the first and second detection signals with respect to variations in the welding parameters now derived for the weld of the working material pieces falls in the favorable range in which parts of the DC components have been plotted each of which indicates a good result of welding.

8. A method for determining a quality of welding at a weld between working material pieces as claimed in claim 7, wherein the two sheets of the metallic plates is intermittently carried to a work spot of the laser device and wherein the determination of whether the result of the laser welding falls in the favorable range and the identification of the cause of failure in welding are further carried out by determining the cause of the welding failure if the derived DC component values fall out of the favorable range from any one of characteristic lines drawn along the plotted values of the variations in the DC components with respect to the corresponding one of the variations of the welding parameters.

9. A method for determining a quality of welding at a weld between working material pieces as claimed in claim 8, wherein the welding parameters include: an output power of the laser device at a work spot P; a focal length F; and a gap length G of the overlapped seam.

10. A method for determining a quality of welding at a weld between working material pieces as claimed in claim 8, wherein the DC components of each of the first and second detection signals in the control chart are related to the intensities of the laser reflected light detected at the first and second positions.

11. A method for determining a quality of welding at a weld between working material pieces as claimed in claim 8, further comprising producing an alarm when the cause of welding failure is identified.

12. A method for determining a quality of welding at a weld between working material pieces as claimed in claim 1, wherein the laser is a YAG laser.

* * * * *